United States Patent [19]

Watanabe et al.

[11] Patent Number: 4,943,241
[45] Date of Patent: Jul. 24, 1990

[54] APPARATUS FOR INSTALLING A WIRE HARNESS

[75] Inventors: Mitsugu Watanabe; Kazuhiko Kaneko; Etsuji Matsumoto, all of Kosai, Japan

[73] Assignee: Yazaki Corporation, Japan

[21] Appl. No.: 158,324

[22] Filed: Feb. 19, 1988

Related U.S. Application Data

[62] Division of Ser. No. 884,174, Jul. 9, 1986, Pat. No. 4,750,265.

[30] Foreign Application Priority Data

Feb. 18, 1986 [JP] Japan .................... 61-031910

[51] Int. Cl.⁵ ............................ H01R 33/00
[52] U.S. Cl. ..................... 439/34; 174/72 A
[58] Field of Search ............ 439/34, 35; 180/90; 290/70; 179/72 A; 307/10 R

[56] References Cited

U.S. PATENT DOCUMENTS

| | | | |
|---|---|---|---|
| 3,174,576 | 3/1965 | Woofter et al. | 174/72 A X |
| 4,227,239 | 10/1980 | Boyer et al. | 180/90 X |
| 4,360,241 | 11/1982 | Fukunaga | 439/34 |
| 4,493,146 | 1/1985 | Cronin . | |
| 4,508,404 | 4/1985 | Frawley . | |
| 4,718,512 | 1/1988 | Miyazaki | 180/90 |

FOREIGN PATENT DOCUMENTS

| | | |
|---|---|---|
| 0091618 | 10/1983 | European Pat. Off. . |
| 0108522 | 5/1984 | European Pat. Off. . |
| 3435566 | 4/1986 | Fed. Rep. of Germany . |
| 2136255 | 9/1984 | United Kingdom . |

*Primary Examiner*—Eugene F. Desmond
*Attorney, Agent, or Firm*—Lowe, Price, LeBlanc, Becker & Shur

[57] ABSTRACT

Apparatus is provided for installing a wire harness of an automobile which facilitates installation of a wire harness onto a car body. First of all the wire harness and electrical equipment are fixed on a carrier panel. In the fixing them, the connectors of the wire harness are positioned for connection to the articles of electrical equipment. Some connectors of the wire harness fixed on the carrier panel are adapted to be connected to the connectors of the wire harness on the car body. The thus prepared assembly of carrier panel, the wire harness, the electrical equipment is bodily attached to the car body.

12 Claims, 5 Drawing Sheets

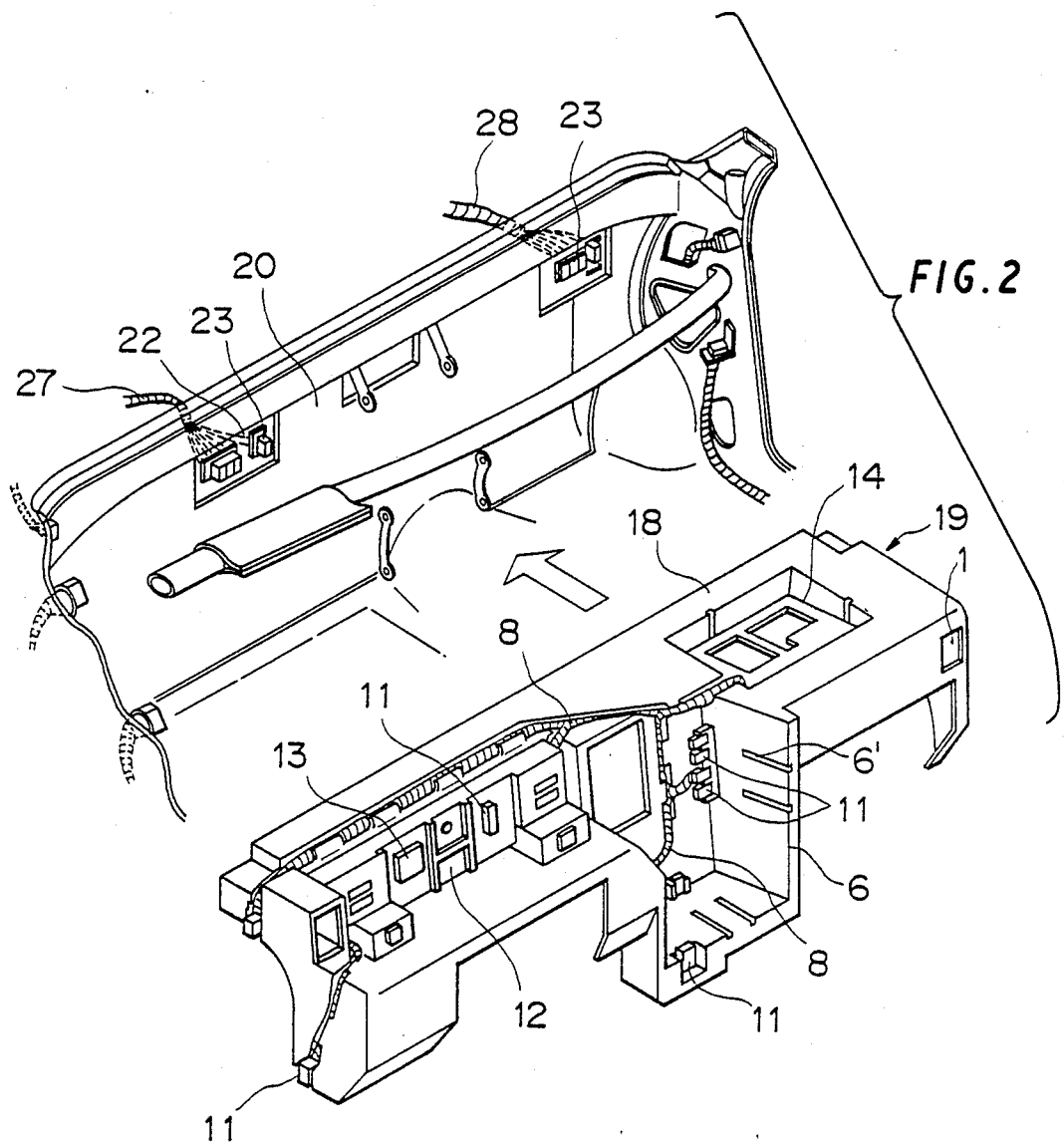

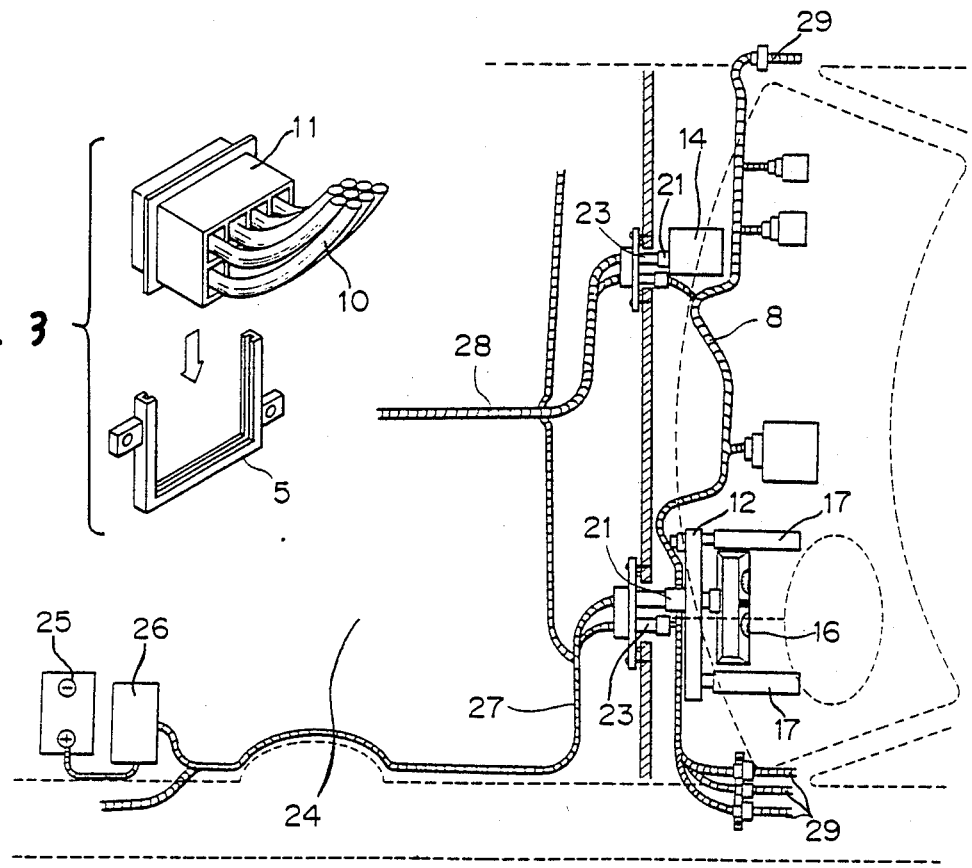

APPARATUS FOR INSTALLING A WIRE HARNESS

This is a division of application Ser. No. 884,174, filed July 9, 1986, now U.S. Pat. No. 4,750,265.

BACKGROUND OF THE INVENTION

This invention relates to improvements in apparatus for installing a wire harness used for an automobile electric circuit into a vehicle body.

Wire harnesses used for automobile electric circuits commonly have such a structure that a large number of branch lines extend from a main line composed of a large number of electric wires bound together or bundled by a wrapping tape. Such a wire harness is installed onto a car body such that the main line thereof is wired in a spacing within an automobile and secured at several portions thereof by fastening means and the branch lines are then connected by means of connectors provided at ends of the branch lines to electrical equipment including several loads such as a motor and a solenoid, switches, and electric connection boxes such as a junction box and a fuse box.

An example of wire harness installation will be described below with reference to the drawings. Referring to FIG. 5, an instrument panel 31 molded from a synthetic resin material and a reinforcement member 32 made of a metal material are shown. The reinforcement member 32 is secured to a car body either by means of bolts or by welding, and the panel 31 is mounted on the reinforcement member 32. A wire harness 33 has a main line portion 34 and a plurality of branch lines 35 extending from the main portion 34. The branch portions 35 may be varied in length and extend irregularly in various directions from the main portion 34. Several fastening members 36 such as clips are provided on the main portion 34. The wire harness 33 is secured to the panel 31 or the reinforcement member 32 by means of the fastening members 36 or wire bands. The main portion 34 extends at an end thereof through a through-hole 38 in a car body fire wall 37 to an engine room 39 as shown in FIG. 6. A grommet 40 is fitted in the through-hole 38 of the fire wall 37 for protecting and securing the wire harness 33. Connection of the wire harness 33 to articles of electrical equipment 41 (only one is shown in FIGS. 5 and 6) may be established by means of connectors 42 provided at ends of the main portion 34 and/or the branch portions 35.

In such a wire harness of a bundle form as described above and a process of installing the same, coupling of connectors to various articles of electrical equipment is all accomplished by manual operation because the connectors are provided at ends of branch portions which extend like freely movable branches from the main portion of the wire harness, and hence hands of operators to accomplish such manual operation and spacings in which a hand can operate are required. Besides, where connectors are concentrated such as connectors 42' (FIG. 5) to be coupled to various instruments at the instrument panel, a handle column or several switches, the wire harness is larger in diameter, which makes arrangement of the wire harness and practical use of spacings further difficult. Further, in order to thread the wire harness through a through-hole of the car body, protection and fixation thereof by means of a grommet is required, and hence a hand of an operator is essentially required for installation of the wire harness. In addition, connection of the wire harness 33 with another wire harness can be done only after assembly of the panel and the reinforcement member to the car body and also requires a hand of an operator.

Thus, according to the prior art, connecting operations of a wire harness to various articles of electrical equipment depend mostly upon manual operations and it is difficult to reduce the number of man-hours for installation of the wire harness and automate such installation using a machine, which makes a serious obstruction to speed-up in automobile production lines. Besides, since manual operations are primarily involved, spacings for manual installation operations are required, which makes it difficult to entirely compact the system.

SUMMARY OF THE INVENTION

It is an object of the present invention to provide apparatus for installing a wire harness or like articles of electrical equipment in an automobile by minimizing manual installation procedures and facilitate automation using a machine such as a robot.

It is another object of the invention to provide process of and apparatus for installing a wire harness or like articles of electrical equipment of an automobile or the like which can allow speed-up of production lines by automation and reduction of the number of man-hours.

It is a further object of the invention to provide an apparatus for installing a wire harness which can be made compact to allow effective utilization of a spacing within an automobile.

According to another aspect of the present invention, there is provided an apparatus for installing a wire harness by securing the same within an automobile and connecting said wire harness to articles of electrical equipment of the automobile by way of a plurality of connectors attached at ends of a main portion and branch portions of the wire harness, said apparatus comprising a carrier panel adapted to be attached to a car body having wire harness means installed therein; wire harness fixed to said carrier panel and having a main portion and branch portions at respective ends of which a plurality of connectors are attached, said connectors including a first connector and a second connector, said first connector being for connection to said wire harness means of the car body; articles of electrical equipment installed on said carrier panel; and means for positioning said second connector to face a first selected member of said articles of electrical equipment.

For the carrier panel in the present invention, not only a member having a solid structure such as an instrument panel or a reinforcement member as described above but also a member in the form of a plate such as a car body fire wall as described above or a door panel which has a configuration to allow securing by a suitable means such as welding or fastening with a bolt are used depending upon desired spacings of the automobile.

The carrier panel has provided in advance on a wall thereof a fixing means along a wiring pattern of the wire harness and where necessary installing means having a configuration corresponding to an article of electrical equipment. The fixing means may be a groove or grooves formed continuously or intermittently in an inner wall of the panel for receiving and securing the wire harness therein or a plurality of clamps projectingly provided in a spaced relationship by a suitable distance from each other for holding the wire harness therein or else a combination of such groove or grooves and clamps. The grooves or clamps may be provided corresponding to the main portion and the branch portions of the wire harness and may be formed widely or narrowly so as to accommodate or hold thick or thin portions of the wire harness therein. Normally, the installing means for electrical equipment are each provided either in the form of a frame element or a fitting window having a locking means for electrical equipment. Since the electrical equipment may be any of various devices such as load devices including a lamp, a motor, a solenoid, a relay or a radio, controlling devices such as a switch, a sensor and a control unit for controlling such load devices, indicating devices such as an instrument and electric connection boxes such as a fuse box and a relay box, the positioning guides are formed in conformity with configurations of the devices.

Further, means for positioning an attached connector of the wire harness is provided at a position in each of the installing means which is opposed to a connector provided for electrical equipment when an article of electrical equipment is fitted and secured in the installing means. The positioning means may be either a fitting rail which is formed in integral relationship on the carrier panel for fitting the attached connector vertically or horizontally thereon or any other known means such as a fastening screw.

According to the apparatus of the invention, the harness is put it from the front or a side of the carrier panel and is wired and secured along the fixing members whereafter the connectors provided at ends of the main and branch portions of the wire harness can be put in utilizing spacings of the installing means formed to open for the electrical equipment. Accordingly, operations therefor are easy. Further, since coupling of the attached connector to a connector of electrical equipment is established automatically by fitting of the electrical equipment in position as described above, there is no need of forming an additional operation space for connection of connectors as in the prior art.

In this manner, since a wire harness, connectors attached to the wire harness and electrical equipment are installed in a compact configuration using the carrier panel, a limited small space within an automobile can be utilized effectively. In addition, according to the apparatus of the invention, since various articles of electrical equipment necessitated by an automobile can be installed or formed integrally on the carrier panel, operations for mounting the electrical equipment and for installing the wire harness which have been conventionally conducted in production lines of an automobile maker can be transferred to a wire harness maker, which will allow speed-up of production lines.

BRIEF DESCRIPTION OF THE DRAWINGS

FIG. 2 is a perspective view showing the apparatus of FIG. 1 in a somewhat assembled form;

FIG. 3 is a perspective view showing means for positioning an attached connector of a wire harness of the apparatus of FIG. 1;

FIG. 4 is a wiring diagram of the wire harness where an apparatus according to the present invention is applied to a portion of an automobile near an instrument panel;

DESCRIPTION OF THE PREFERRED EMBODIMENT

Now, the present invention will be described in detail with reference to the accompanying drawings.

Figure 1:
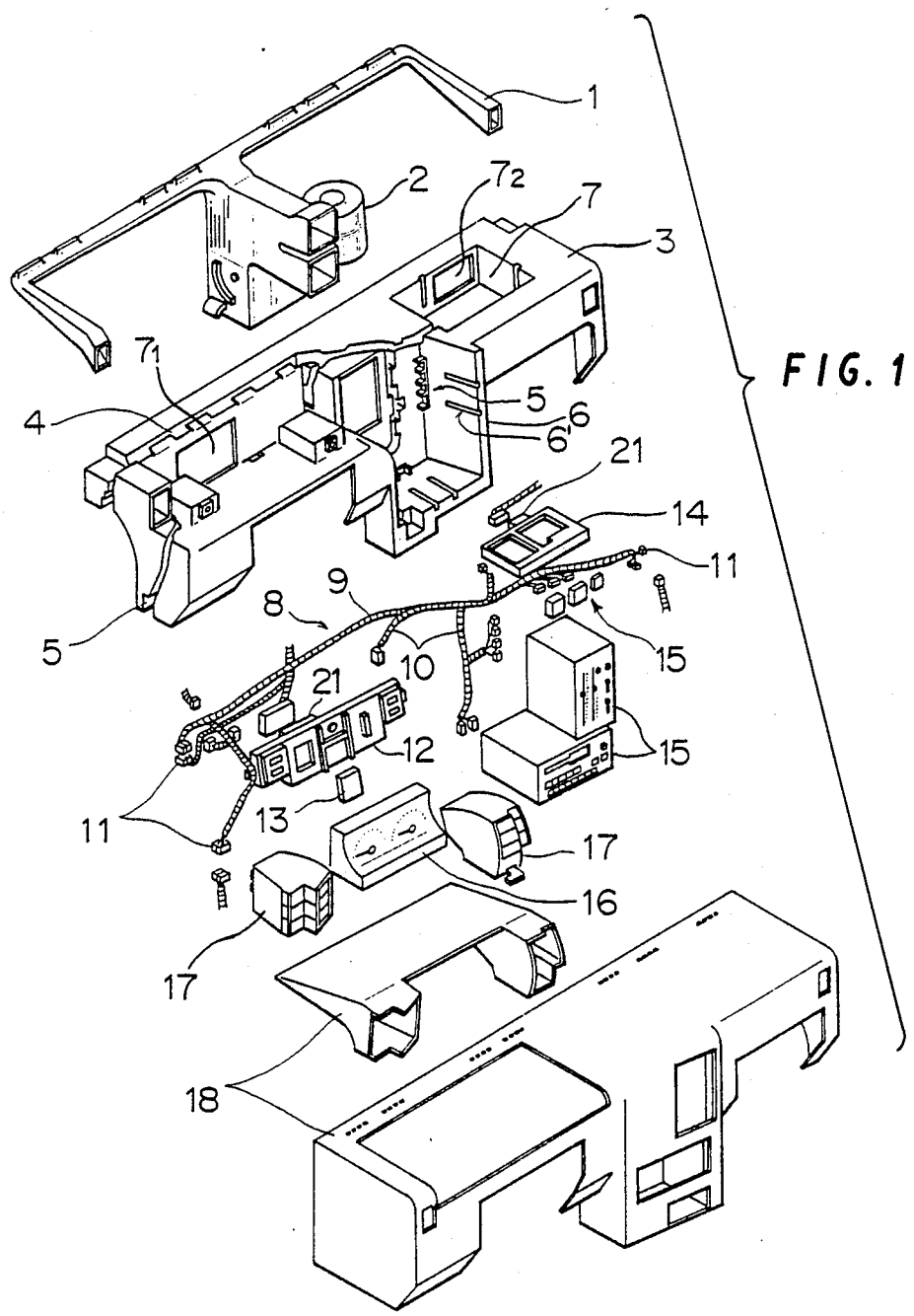
FIG. 1 is an exploded perspective view illustrating a preferred embodiment of apparatus according to the present invention.
Figure 5:
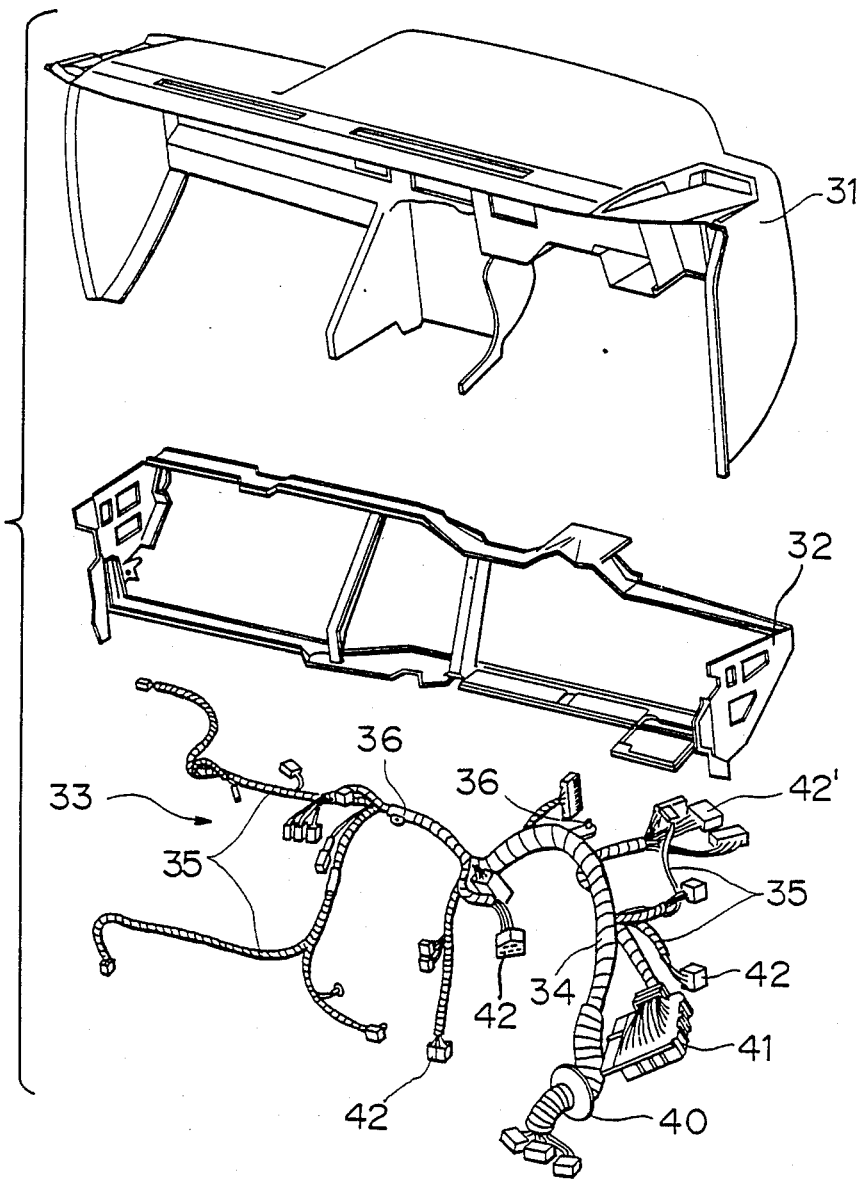
FIG. 5 is a perspective view showing a prior art apparatus.

Referring first to FIG. 1, a blower motor 2 is located on a duct (blast pipe) 1. A carrier panel 3 is produced either by molding a plastics material or by stamping a metal plate or else by resin treatment on a metal plate. The carrier panel 3 has formed on an inner wall thereof a groove 4 for fixing therein a wire harness 8 having a main portion 9 and a plurality of branch portions 10. A fixing bracket 5 to securely receive therein a connector 11 provided at an end of each branch portion 10 as shown in FIG. 3 is secured at an end of the groove 4 by means of fastening screws. The carrier panel 3 further has therein installing means for securing various articles of electrical equipment as hereinafter described. The installing means may be each formed either as a frame element such as indicated at 6 or as a fitting hole or window such as indicated at 7. Another fixing bracket 5 may be provided to face said frame element 6. Guide grooves 6' are provided in the inner walls of said frame elements 6 to receive engagement means of said electrical equipment.

The electrical equipment secured to the carrier panel 3 may include a junction block 12, an option unit 13 which may be mounted on the junction block 12 depending upon a grade of the automobile, a microcomputer unit (CPU) 14 for controlling an engine, various electronic units 15 such as an air conditioner and a car stereo set, metering instruments 16, cluster switches 17 etc. Of these articles of electrical equipment, the electronic units 15 are installed on the carrier panel 3 to be connected to the wire harness 8 through the respective connectors 11. On the other hand, the instruments 16 and the cluster switches 17 are directly connected to the junction block 12.

A panel cover 18 is mounted for covering the members 1 to 17 described above.

According to the apparatus of the present embodiment, connection of the wire harness 8 to the various articles of the electrical equipment 12 to 17 can be established very simply by forcing the wire harness 8 into the groove 4 from forwardly in the carrier panel 3 to secure the same thereto, fitting the attached connectors 11 of the wire harness 8 into the individual fixing brackets 5 from forwardly or through openings of the carrier panel 3, and then fitting various articles of electrical equipment indicated by reference numerals 12 to 17 onto or into the individually designated frame elements 6 or fitting holes (windows) 7.

Afterwards, an assembly 19 having the panel cover 18 securely mounted thereon is assembled to a car body 20 as shown in FIG. 2. The assembly 19, that is, the carrier panel 3, has a pair of fitting windows 7₁ and 7₂ opened in an interior wall thereof as shown in FIG. 1, and the junction box 12 and the CPU 14 are secured in the fitting windows 7₁ and 7₂, respectively.

The junction box 12 and the CPU 14 have connectors 21 provided thereon and extending through and from the fitting windows 7₁ and 7₂, respectively, while counterpart connectors 23 are provided in through-holes 22 of the car body 20. Accordingly, the wire harness 8 can be connected by way of a connector coupling to a main wire harness 27 led from a battery 25 and a fuse box 26 in an engine room 24 as shown in FIG. 4 while the CPU 14 can be connected by way of a connector coupling to an engine controlling wire harness 28 extending to the engine room 24. Furthermore, the wire harness 8 on the carrier panel 3 can be connected directly to a main wire harness 29 installed in the car body for supplying power to the rear portion electrical equipment or doors.

Figure 6:
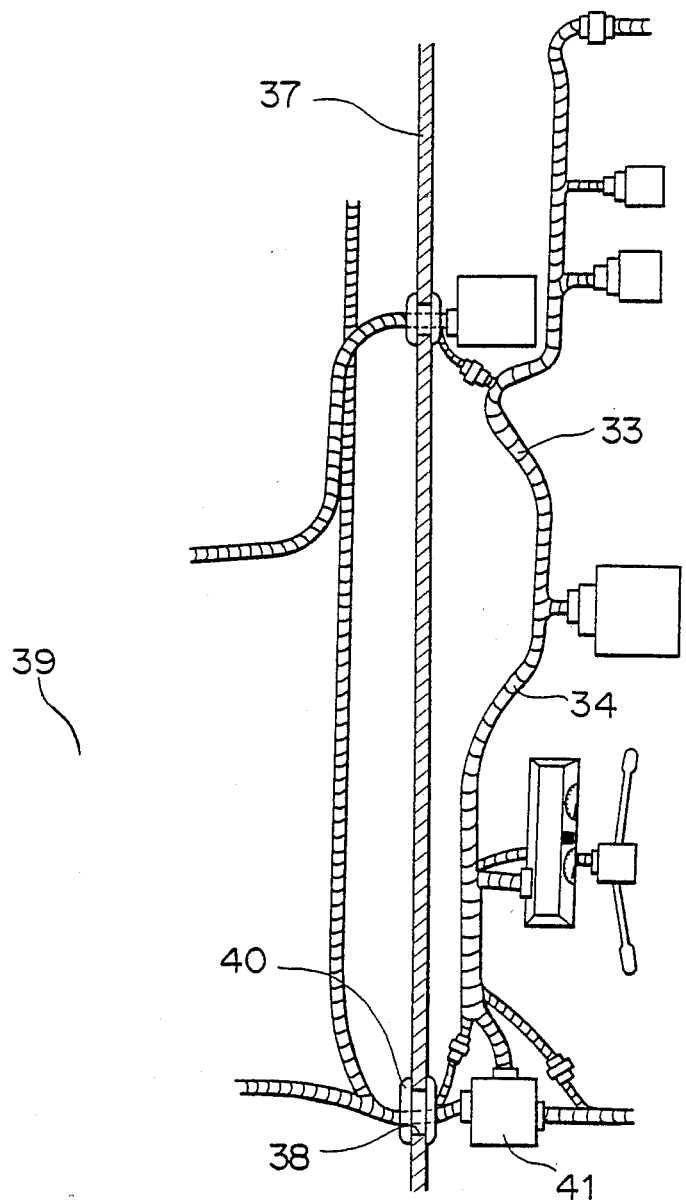
FIG. 6 is a wiring diagram of a wire harness near an instrument panel of an automobile according to the prior art.

Consequently, complicated operations such as threading of a wire harness of a large diameter through a through-hole in a car body and fitting of a grommet as in the case of FIG. 6 which shows an example of prior art arrangement can be eliminated. Besides, since there is no operation for threading a wire harness, wiring of a wire harness in a car can be accomplished independently for an engine room, an instrument panel and a seat, resulting in improvements in operability.

In this manner, by provision in a carrier panel of at least one electric connection box such as the junction box 12 which has a coupling means including a connector for connection with another wire harness, steps of installing a wire harness can be reduced and automation thereof can be facilitated.

What is claimed is:

1. An apparatus for installing a wire harness by securing the same within an automobile and connecting said wire harness to articles of electrical equipment of the automobile, said apparatus comprising:
a carrier panel adapted to be attached to a car body having wire harness means installed therein;
said wire harness fixed to said carrier panel and having a main portion and branch portions at respective ends of which a plurality of connectors are attached, said connectors including a first connector and a second connector, said first connector being fixed and positioned on said carrier panel for connection to said wire harness means of the car body;
means for installing articles of electrical equipment on said carrier panel; and
means for fixing and positioning said second connector on said carrier panel to face a first selected member of said articles of electrical equipment;
wherein said carrier panel has a car body side and a passenger room side, said wire harness being fixed to the carrier panel on the passenger room side thereof.

2. An apparatus according to claim 1, wherein said articles of equipment are installed on the carrier panel on the passenger room side thereof, said carrier panel being provided with aperture means for permitting a second selected member of the articles of electrical equipment to be mounted in the aperture means for connection on the car body side.

3. An apparatus according to claim 1, wherein said fixing means includes grooves formed in the carrier panel on the passenger room thereof to receive the wire harness and provide a predetermined wiring pattern.

4. An apparatus according to claim 1, wherein said fixing means includes a plurality of clips formed in the passenger room side of the carrier panel to provide a predetermined wiring pattern.

5. The apparatus of claim 1, wherein said fixing means includes a fixing bracket mounted to the carrier panel to receive and preposition, respectively, the first connector formed at a one end of the wire harness.

6. The apparatus of claim 5, wherein said fixing bracket is screwed to the carrier panel.

7. Apparatus of claim 6, wherein said fixing bracket includes a guide channel enabling first connector to be received in the guide channel of the fixing bracket.

8. Apparatus for installing a wire harness within an automobile, comprising in combination:
a carrier panel adapted to be attached to a car body;
the wire harness fixed to said carrier panel and having a main portion and branch portions;
a plurality of connectors attached to respective ends of said main and branch portions,
means for installing articles of electrical equipment on said carrier panel;
means for fixing and prepositioning said connectors directly on said carrier panel to respectively face selected members of said articles of electrical equipment,
wherein said fixing means includes a fixing bracket mounted to the carrier panel to receive and preposition, respectively, the connectors formed at ends of the wire harness; and
wherein said fixing bracket is screwed to the carrier panel.

9. The apparatus of claim 8, wherein said carrier panel includes a groove for receiving the wire harness to secure it to the carrier panel.

10. Apparatus of claim 8, wherein said fixing bracket includes a guide channel enabling the connector to be received in the guide channel of the fixing bracket.

11. Apparatus of claim 8, wherein said installing means includes a frame element for receiving a selected one of said articles and said fixing bracket to which the connector is attached and prepositioned to electrically connect the wire harness to the selected article when said article is mounted to the frame element.

12. Apparatus of claim 8, wherein said installing means includes a fitting hole for receiving a selected one of said articles and said fixing bracket to which the connector is attached and prepositioned to electrically connect the wire harness to the selected article when said article is mounted to the fitting hole.

* * * * *